United States Patent
Don et al.

(10) Patent No.: US 11,327,888 B2
(45) Date of Patent: *May 10, 2022

(54) USING STORAGE CLASS MEMORY AS A PERSISTENT OPERATING SYSTEM FILE/BLOCK CACHE

(71) Applicant: EMC IP Holding Company LLC, Hopkinton, MA (US)

(72) Inventors: Arieh Don, Newton, MA (US); Adnan Sahin, Needham Heights, MA (US); Owen Martin, Hopedale, MA (US); Peter Blok, Zoetermeer (NL); Philip Derbeko, Modiin (IL)

(73) Assignee: Dell Products L.P., Hopkinton, MA (US)

( * ) Notice: Subject to any disclaimer, the term of this patent is extended or adjusted under 35 U.S.C. 154(b) by 277 days.

This patent is subject to a terminal disclaimer.

(21) Appl. No.: 16/597,951

(22) Filed: Oct. 10, 2019

(65) Prior Publication Data

US 2020/0042447 A1 Feb. 6, 2020

Related U.S. Application Data

(63) Continuation of application No. 15/282,247, filed on Sep. 30, 2016, now Pat. No. 10,496,539.

(51) Int. Cl.
*G06F 12/00* (2006.01)
*G06F 12/06* (2006.01)
*G06F 12/0817* (2016.01)
*G06F 12/0813* (2016.01)
*G06F 12/084* (2016.01)

(52) U.S. Cl.
CPC ........ *G06F 12/0828* (2013.01); *G06F 12/084* (2013.01); *G06F 12/0813* (2013.01); *G06F 2212/154* (2013.01); *G06F 2212/60* (2013.01); *G06F 2212/621* (2013.01)

(58) Field of Classification Search
CPC ............ G06F 12/0828; G06F 12/0813; G06F 12/084; G06F 2212/154; G06F 2212/60; G06F 2212/621
See application file for complete search history.

(56) References Cited

U.S. PATENT DOCUMENTS

| | | | |
|---|---|---|---|
| 9,984,079 B1* | 5/2018 | Stickle | H04L 67/1097 |
| 2006/0179188 A1* | 8/2006 | Mimatsu | H04L 67/1097 |
| | | | 710/65 |
| 2007/0235520 A1* | 10/2007 | Smith | G06Q 40/00 |
| | | | 235/379 |
| 2014/0365725 A1* | 12/2014 | Barrell | G06F 3/0646 |
| | | | 711/113 |

(Continued)

*Primary Examiner* — Shawn X Gu
*Assistant Examiner* — Mohammad S Hasan
(74) *Attorney, Agent, or Firm* — Anderson Gorecki LLP

(57) ABSTRACT

A host server in a server cluster has a memory allocator that creates a dedicated host application data cache in storage class memory. A background routine destages host application data from the dedicated cache in accordance with a destaging plan. For example, a newly written extent may be destaged based on aging. All extents may be flushed from the dedicated cache following host server reboot. All extents associated with a particular production volume may be flushed from the dedicated cache in response to a sync message from a storage array.

20 Claims, 2 Drawing Sheets

(56) References Cited

U.S. PATENT DOCUMENTS

2015/0010143 A1* 1/2015 Yang ................... H04L 9/3249
                                                    380/28
2015/0347310 A1* 12/2015 Ish ..................... G06F 12/0871
                                                    711/3
2017/0220476 A1* 8/2017 Qi ...................... G06F 12/0888
2017/0318114 A1* 11/2017 Smith ................ H04L 67/1097

* cited by examiner

USING STORAGE CLASS MEMORY AS A PERSISTENT OPERATING SYSTEM FILE/BLOCK CACHE

BACKGROUND

The subject matter of this disclosure is generally related to data storage systems that are used to maintain large data sets for supporting multiple host applications and concurrent users. Host applications, including but not limited to file servers, block servers and databases, may run on a server in a server cluster. Storage arrays may be used to maintain data for the host applications. Each storage array may include multiple computing nodes that manage access to tangible persistent data storage devices on which host application data is maintained. There are typically multiple levels at which host application data may be cached in volatile memory between the storage array and the host server, where different levels have different proximity to the processor of the host server. Proximity of host application data to the host server processor may be directly related to host application performance because the rate at which a processor can process host application data may be limited by the rate at which that data can be provided to the processor. A variety of techniques exist for managing use of the limited volatile memory resources that are available with close proximity to the host server processor.

SUMMARY

All examples, aspects and features mentioned in this document can be combined in any technically possible way.

In accordance with an aspect an apparatus comprises: a computing device comprising a processor, a non-volatile cache, a host application, a memory allocator that allocates a portion of the non-volatile cache as a dedicated host application data cache, and a destaging program stored on non-transitory memory that destages host application data from the host application data cache in accordance with a destaging plan. In some implementations the dedicated host application data cache is accessed at a file or block size level. In some implementations the destaging program sends a dirty page message to another computing device in response to a newly written host data extent being written into the dedicated host application data cache. In some implementations the host is responsive to a dirty page message from another computing device to refrain from accessing corresponding host application data. In some implementations the destaging program is responsive to a newly written host data extent being written into the dedicated host application data cache to start an aging timer associated with that newly written host data extent. In some implementations the destaging program destages the newly written host data extent from the dedicated host application data cache when the associated aging timer expires. In some implementations the destaging program destages all extents of host application data from the dedicated host application data cache in response to reboot of the computing device. In some implementations the destaging program destages all extents of host application data from the dedicated host application data cache in response to a first agreed upon value in a first message received from a storage array in which the host application data is stored. In some implementations the destaging program halts caching of the host application data in response to a second agreed upon value in a second message received from the storage array.

In accordance with an aspect a method comprises: in a computing device comprising a processor, a non-volatile cache, and a host application: allocating a portion of the non-volatile cache as a dedicated host application data cache; and destaging host application data from the host application data cache in accordance with a destaging plan. Some implementations comprise accessing the dedicated host application data cache at a file or block size level. Some implementations comprise sending a dirty page message to another computing device in response to a newly written host data extent being written into the dedicated host application data cache. Some implementations comprise responding to a dirty page message from another computing device by refraining from accessing corresponding host application data. Some implementations comprise responding to a newly written host data extent being written into the dedicated host application data cache by starting an aging timer associated with that newly written host data extent. Some implementations comprise destaging the newly written host data extent from the dedicated host application data cache when the associated aging timer expires. Some implementations comprise destaging all extents of host application data from the dedicated host application data cache in response to reboot of the computing device. Some implementations comprise destaging all extents of host application data from the dedicated host application data cache in response to a first agreed upon value in a first message received from a storage array in which the host application data is stored. Some implementations comprise halting caching of the host application data in response to a second agreed upon value in a second message received from the storage array.

In accordance with an aspect a system comprises: a storage array that stores host application data, the storage array presenting a production volume associated with the host application data; and a plurality of host computers that each run at least one instance of a host application that accesses the production volume, each host computer having a processor and a non-volatile cache into which files or blocks of the host application data may be written, each host computer comprising logic that sends a dirty page message to other ones of the plurality of host computers in response to newly written host application data being written into the non-volatile cache, logic that destages host application data from the non-volatile cache of the host computer when an aging timer associated with the newly written host application data expires, logic that destages all extents of host application data from the non-volatile cache after the host computer is rebooted, and logic that halts caching of the host application data and halts caching of the host application data in response to a first value in a first message from the storage array. In some implementations each host computer comprises logic that resumes caching of the host application data in response to a second value in a second message from the storage array.

DETAILED DESCRIPTION

Some aspects, features and implementations described herein may comprise computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. A "host application" is a computer program that accesses a storage service from a storage system via a storage network. A "production volume" is a logical unit of storage presented by a storage system for use by host applications. The storage system manages the underlying tangible storage devices used to implement the storage services for the production volume. Without limitation, the production volume may be referred to as a device, logical volume, production LUN or host LUN, where LUN (logical unit number) is a number used to identify the production volume in accordance with the SCSI (small computer system interface) protocol. Multiple production volumes may be organized as a storage group. The term "logic" as used herein refers to instructions that are stored on a non-transitory computer-readable medium and implemented by a processor or instructions implemented by programmed, programmable, or purpose-designed electronic components and other hardware.

Figure 1:
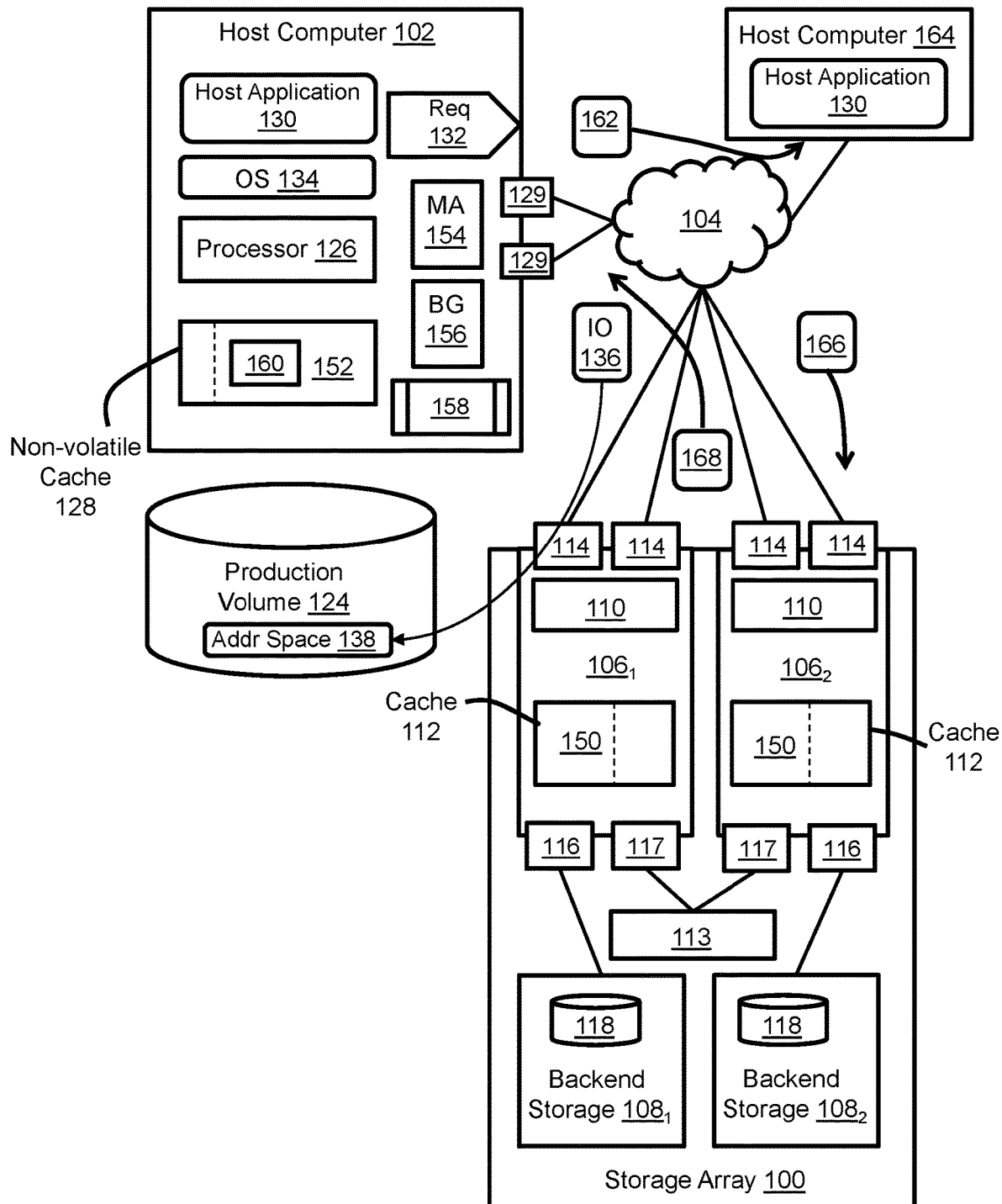
FIG. 1 illustrates a data storage system in which non-volatile cache in a host computer is allocated for file/block level host application data.

FIG. 1 illustrates an exemplary data storage system with a simplified two-level caching hierarchy. The number of cache levels shown is simplified for clarity of explanation and is not to be viewed as limiting. The data storage system includes a storage array 100 and host computers 102, 164. One level of caching is in the host computers 102, 164 and another level of caching is in the storage array 100. Any number of host computers and storage arrays could be included in the data storage system.

The storage array 100 includes multiple computing nodes $106_1$-$106_2$, of which there may be any number, and associated persistent backend storage $108_1$, $108_2$. The computing nodes $106_1$-$106_2$ may include "vanilla" storage servers and specialized hardware platforms including but not limited to storage directors and storage engines that are designed for use in storage arrays. Each computing node includes at least one multi-core processor 110 and a cache 112. The cache 112 may include, for example and without limitation, volatile memory such as RAM (random access memory). Each computing node is connected to every other computing node in the storage array via a channel adapter 117 and an interconnecting device 113 such as a fabric, switch or router, for example and without limitation. Computing nodes may allocate a portion 150 of their respective cache 112 to a shared "global" cache that can be directly accessed by other computing nodes of the storage array. For example, the global cache may be accessed via RDMA (remote direct memory access) between computing nodes. The computing nodes include FAs (front-end adapters) 114 for communicating with the host computers 102, 164, and DAs (disk adapters) 116 for communicating with backend storage $108_1$, $108_2$. The backend storage may include sets of tangible persistent data storage devices $118_2$, for example and without limitation SSDs (solid state devices) $118_1$ (e.g., NAND flash and NOR flash) and HDDs (hard disk drives). The tangible data storage devices of the backend storage may be organized into RAID groups, and snaps, clones and mirrors may be created for the data sets stored in backend storage. The computing nodes $106_1$, $106_2$ maintain at least one logical production volume 124 that is backed by the persistent data storage devices in backend storage. The production volume 124 represents an abstraction layer between the host computer 102 and backend storage.

The host computers, of which host computer 102 and host computer 164 are exemplary, may be servers that include a multi-core processor 126 and a non-volatile (persistent) cache 128. The host computer may also include volatile memory (not illustrated). The non-volatile cache 128 may include high performance SSDs such as PCM (phase change memory) of a type referred to herein as SCM (storage class memory), an example of which is presently known under the trade name 3DXP (three-dee cross-point) memory. Storage class memory is currently an emerging memory technology that may come to be known by a variety of names in the future. The term storage class memory is therefore used broadly in this disclosure to encompass the memory technology without being limited to any specific manufacturer's product associated with any particular name or trade name. The non-volatile cache 128 may be implemented close to the host processor 126. For example and without limitation, the non-volatile cache 128 may be implemented in a DIMM (dual inline memory module) on the same motherboard as the processor 126, or on the same semiconductor die as the processor 126. The non-volatile cache 128 may be bit and block addressable and, although non-volatile, may be utilized by the host computer for purposes for which RAM was previously used. Host ports 129 are connected to a storage network 104. Each host port may be associated with a network path to a particular storage array port associated with an FA 114. Any number of ports may be included and the host does not necessarily have access to all of the front end ports and FAs. The network 104 may include various network nodes, e.g. switches, routers, hubs, and other network devices, and may include one or more of the Internet, a WAN (wide area network), MAN (metropolitan area network) and LAN (local area network).

A host application 130 running on the host computers 102, 164 utilizes the storage services of the storage array 100. Examples of host applications include but are not limited to a database, file server and block server. From the perspective of the host application 130, host application data resides on production volume 124 which is presented to the host computers 102, 164 by the storage array 100, for example and without limitation exclusively for the host application data. There may be any number of instances of host applications running on the host computers, e.g., in containers or on virtual machines, and any number of corresponding production volumes. Files and blocks of host application data from the production volume may be active, e.g. recently accessed, or inactive, e.g. not recently accessed. When inactive host application data is accessed by the host application running on host computer 102 the data may be copied from backend storage into the storage array cache 112, and subsequently copied from there into the host's non-volatile cache 128. For example, host application 130 may prompt caching by generating a request 132 to read host application data. In response to the request 132, the OS (operating system) 134 running on host computer 102, e.g., an OS associated with a virtual machine or container, refers to the non-volatile cache 128 to determine whether the data is resident therein. If the data is resident, i.e. in the case of a "cache hit," the data is provided to the host application 130 from the cache 128, e.g. for one or more processor threads. If the data is not resident in the host's non-volatile cache 128, i.e. in the case of a "cache miss," then an IO 136 is generated and sent to the storage array 100 via the network 104. The IO 136 indicates an address space 138 of production volume 124. The IO 136 is received on an FA 114 of one of the computing nodes, e.g. computing node $106_1$, and queued for service. Depending on the specific implementation of the storage array, the computing node $106_1$ refers to its local cache 112, shared global cache, or both to determine whether the data is resident in cache in the storage array. If the data is resident in storage array cache 112 (i.e., a cache hit) then the data is provided to the host computer 102 via the network 104, and the data is copied to into the host's non-volatile cache 128 and provided to the host application 130. If the data is not resident in the storage array cache 112 (i.e., a cache miss) then the data is copied from backend storage $108_1$ into the storage array cache 112. The data is then provided to the host device 102 where it is copied into the host's non-volatile cache 128 and provided to the host application 130. When host application 130 generates a request 132 in order to write data, the data is copied into the host's non-volatile cache 128 and eventually used to generate IO 136. One of the computing nodes receives the IO and copies the data into storage array cache 112. The data is eventually destaged from storage array cache 112 to backend storage. It can be seen that required data is provided most quickly to the host processor 126 from the host's non-volatile cache.

In previously known host servers the host server cache consists of volatile memory such as RAM. Consequently, newly written data could be lost as a result of a server reboot or loss of power. In order to decrease the likelihood of data loss, newly written data would be quickly destaged to persistent storage in the storage array. For example, a "dirty bit" could be set in the host cache to prompt the host OS to quickly destage the newly written data to the storage array for storage on non-volatile storage media. Previously known host servers also had relatively small caches due to the high cost of RAM. Such shortcomings may be mitigated by the implementation of the non-volatile cache 128 in the host computer, as will be explained in greater detail below.

In some implementations at least a portion of the host's non-volatile cache 128 is configured as a dedicated file/block cache 152 for host application data. For example and without limitation, a memory allocator 154 in the host computer 102 may be modified to allocate some or all of the non-volatile cache 128 for exclusive use in storing host application data, e.g. for access at the file or block size. Because the dedicated file/block cache 152 is non-volatile, the host OS does not necessarily need to destage dirty extents of host application data to the storage array 100 as quickly as was done with RAM-based cache. Rather, a background routine 156 running on the host computer may destage dirty extents from the dedicated file/block cache 152 to the storage array 100 at some later time in accordance with a destaging plan 158. For example and without limitation, in accordance with the destaging plan the dirty extents may be stored in the dedicated file/block cache 152 without being destaged for up to a user-specified aging time duration, until a host computer reboot occurs, or until prompted to flush the host cache by the storage array, whichever occurs first.

Figure 2:
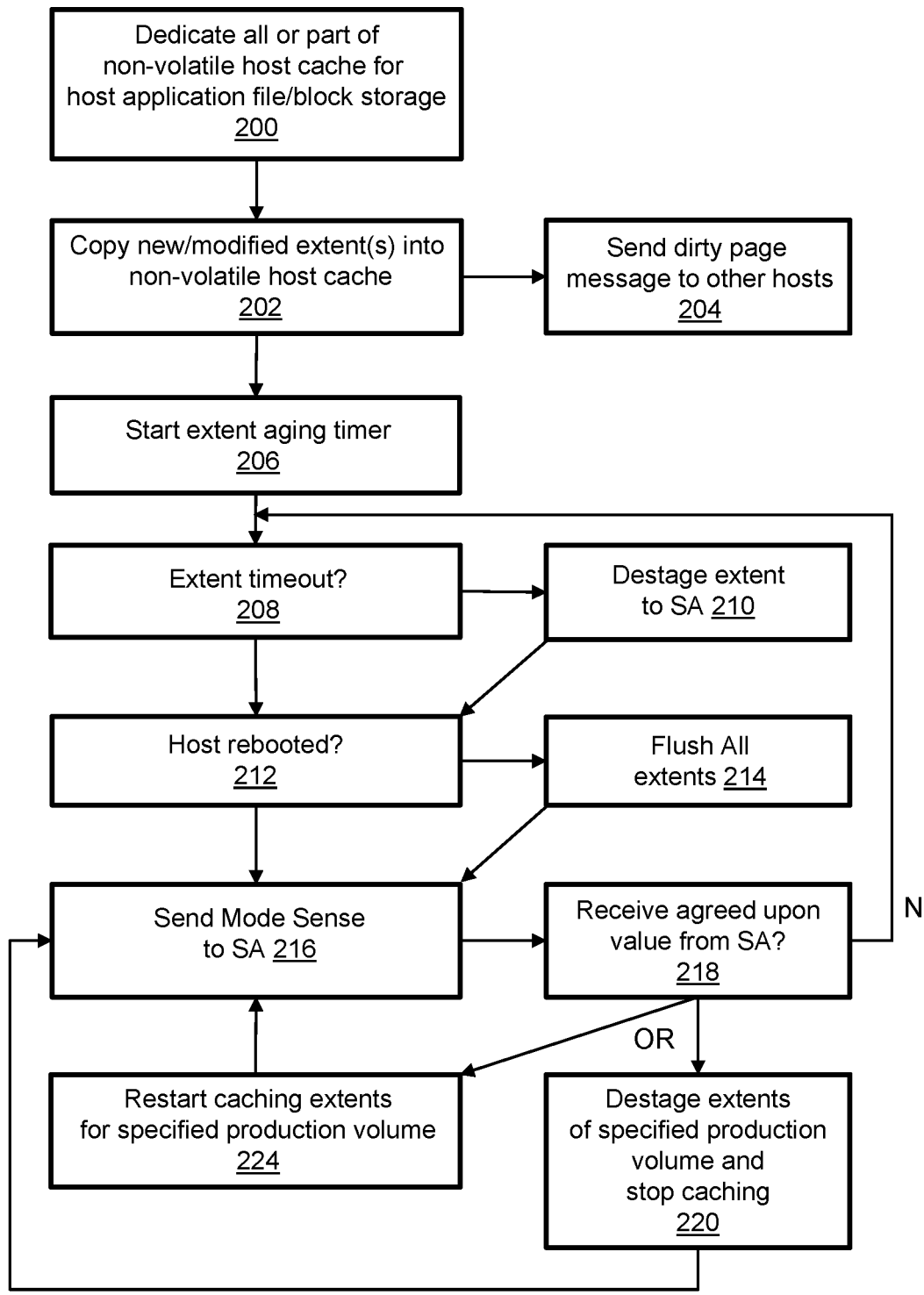
FIG. 2 illustrates a technique for using non-volatile host computer cache for file/block level caching of host application data.

FIG. 2 illustrates a process of automatically controlled destaging file/block size data extents from the host's dedicated non-volatile file/block cache by the background routine in accordance with the destaging plan. Referring to FIGS. 1 and 2, some or all of the host's non-volatile cache 128 is used to create the dedicated file/block cache 152 for one or more specified host applications as indicated in block 200, which may be viewed as a preparatory action. File or block sized data extents are written into the dedicated file/block cache 152 as part of normal operation of the host application 130, including a newly written (possibly completely new or modified) data extent 160 as indicated in block 202. In response, the host computer 102 sends a dirty page message 162 to host computer 164, and any other host computers which utilize the production volume 124 with which the newly written data extent is associated, as indicated in block 204. As previously mentioned, multiple instances of the host application 130 may run on multiple host computers in one or more clusters that utilize the same production volume that is presented by the storage array 100. Each of those host computers may receive a copy of the dirty page message 162. The dirty page message indicates that data extent 160, e.g. the file/block at address space 138, has been created, deleted, changed or otherwise newly written. In response, host computer 164 may refrain from creating inconsistency by accessing the specified data. Also in response to the copying of the newly written data extent 160 into the dedicated file/block cache 152 the background routine 156 starts an extent aging timer associated with the newly written data extent as indicated in block 206.

Various conditions may trigger destaging or flushing of the newly written data extent 160 from the dedicated file/block cache 152. For example, if the extent aging timer expires as indicated in block 208 then the newly written data extent 160 is destaged from the dedicated file/block cache 152 to the storage array as indicated in block 210. In some implementations there may be multiple caching levels within the host computer and the newly written data extent may be destaged from the dedicated file/block cache to another cache level within the host computer prior to being destaged to the storage array. If the host computer is rebooted for any reason as determined in block 212 then the newly written data extent 160 and all other extents in the dedicated file/block cache 152 may be flushed to the storage array as indicated in block 214. Another situation that may trigger destaging of the newly written data extent to the storage array is a prompt from the storage array. For example, the storage array may prompt destaging of some or all extents from the host computers in order to sync a data set such as production volume 124 in preparation for storage array reboot or maintenance. In order to enable the storage array to prompt destaging of data extents the host computer 102 may send mode sense messages 166 to the storage array as indicated in block 216. The storage array 100 may be a SCSI target and the host computer 102 may be a SCSI initiator. The storage array may therefore be adapted to respond to the mode sense message 166 by prompting the host computer to take some needed action, if any, by sending a data message 168 to the host computer. The storage array may signal a desired action by including one of a plurality of agreed upon values in the data message 168. As determined in block 218, if the data message 168 does not include one of the agreed upon values then the host computer continues to monitor for extent timeout, host reboot and subsequent mode select messages. However, if the host computer receives an agreed upon value in the data message from the storage array then the host computer performs accordingly. For example, a first agreed upon value may prompt the host computer to destage all of the data extents of a specified production volume and stop further caching associated with that production volume as indicated in block 220. During and after destaging the extents the host computer continues to send mode sense messages to the storage array as indicated in block 216, and data messages may be sent in response. A subsequent data message received from the storage array may include a second agreed upon value as determined in block 218 that may prompt the host computer to resume caching for the specified device as indicated in block 224. Again, the host computer continues to send mode sense messages to the storage array as indicated in block 216.

In view of the description above it will be understood that host application performance may be enhanced by storing host application data in the dedicated file/block cache 152. More particularly, under the control of the background routine and the destaging plan active host application data may be more quickly provided to the host processor than in at least some known systems. Further, the overhead associated with quickly destaging newly written data from the host cache may be reduced relative to at least some known systems. Such improvements are not necessarily associated with the concepts disclosed herein but may be achieved in some implementations.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
    a computing device comprising a processor that runs a host application, a non-volatile cache that is directly accessed by the processor, a memory allocator that allocates a portion of the non-volatile cache as a dedicated host application data cache, and a destaging program stored on non-transitory memory that destages host application data from the host application data cache in accordance with a destaging plan, wherein the computing device is responsive to a dirty page message from another computing device to refrain from accessing corresponding host application data.

2. The apparatus of claim 1 wherein the destaging program sends a dirty page message to another computing device in response to a newly written host data extent being written into the dedicated host application data cache.

3. The apparatus of claim 1 wherein the destaging program is responsive to a newly written host data extent being written into the dedicated host application data cache to start an aging timer associated with that newly written host data extent.

4. The apparatus of claim 3 wherein the destaging program destages the newly written host data extent from the dedicated host application data cache when the associated aging timer expires.

5. The apparatus of claim 1 wherein the destaging program destages all extents of host application data from the dedicated host application data cache in response to reboot of the computing device.

6. The apparatus of claim 1 wherein the destaging program destages all extents of host application data from the dedicated host application data cache in response to a first agreed upon value in a first message received from a storage array in which the host application data is stored.

7. The apparatus of claim 6 wherein the destaging program halts caching of the host application data in response to a second agreed upon value in a second message received from the storage array.

8. An apparatus comprising:
    a computing device comprising a processor that runs a host application, a non-volatile cache that is directly accessed by the processor, a memory allocator that allocates a portion of the non-volatile cache as a dedicated host application data cache, and a destaging program stored on non-transitory memory that destages host application data from the host application data cache in accordance with a destaging plan, wherein the destaging program destages all extents of host application data from the dedicated host application data cache in response to reboot of the computing device.

9. The apparatus of claim 8 wherein the destaging program sends a dirty page message to another computing device in response to a newly written host data extent being written into the dedicated host application data cache.

10. The apparatus of claim 8 wherein the host is responsive to a dirty page message from another computing device to refrain from accessing corresponding host application data.

11. The apparatus of claim 8 wherein the destaging program is responsive to a newly written host data extent being written into the dedicated host application data cache to start an aging timer associated with that newly written host data extent.

12. The apparatus of claim 11 wherein the destaging program destages the newly written host data extent from the dedicated host application data cache when the associated aging timer expires.

13. The apparatus of claim 8 wherein the destaging program destages all extents of host application data from the dedicated host application data cache in response to a first agreed upon value in a first message received from a storage array in which the host application data is stored.

14. An apparatus comprising:
    a computing device comprising a processor that runs a host application, a non-volatile cache that is directly accessed by the processor, a memory allocator that allocates a portion of the non-volatile cache as a dedicated host application data cache, and a destaging program stored on non-transitory memory that destages host application data from the host application data cache in accordance with a destaging plan, wherein the destaging program destages all extents of host application data from the dedicated host application data cache in response to a first agreed upon value in a first message received from a storage array in which the host application data is stored.

15. The apparatus of claim 14 wherein the destaging program sends a dirty page message to another computing device in response to a newly written host data extent being written into the dedicated host application data cache.

16. The apparatus of claim 14 wherein the host is responsive to a dirty page message from another computing device to refrain from accessing corresponding host application data.

17. The apparatus of claim 14 wherein the destaging program is responsive to a newly written host data extent being written into the dedicated host application data cache to start an aging timer associated with that newly written host data extent.

18. The apparatus of claim 17 wherein the destaging program destages the newly written host data extent from the dedicated host application data cache when the associated aging timer expires.

19. The apparatus of claim 14 wherein the destaging program destages all extents of host application data from the dedicated host application data cache in response to reboot of the computing device.

20. The apparatus of claim 14 wherein the destaging program halts caching of the host application data in response to a second agreed upon value in a second message received from the storage array.

* * * * *